(No Model.) 5 Sheets—Sheet 1.

E. WISEMAN & J. HOLROYD.
HYDROCARBON MOTOR.

No. 600,974. Patented Mar. 22, 1898.

Witnesses
H. van Oldenneel
Otto Munk

Inventors
Edmund Wiseman
John Holroyd
by 
Attorneys

THE NORRIS PETERS CO., PHOTO-LITHO., WASHINGTON, D. C.

(No Model.) 5 Sheets—Sheet 2.

E. WISEMAN & J. HOLROYD.
HYDROCARBON MOTOR.

No. 600,974. Patented Mar. 22, 1898.

WITNESSES: INVENTORS:
Edmund Wiseman
John Holroyd
by
Attys (No Model.) 5 Sheets—Sheet 3.

E. WISEMAN & J. HOLROYD.
HYDROCARBON MOTOR.

No. 600,974. Patented Mar. 22, 1898.

WITNESS:
H. Richard Wobse
Otto Munx

INVENTORS:
Edmund Wiseman
John Holroyd
by
Attys (No Model.) 5 Sheets—Sheet 4.

E. WISEMAN & J. HOLROYD.
HYDROCARBON MOTOR.

No. 600,974. Patented Mar. 22, 1898.

Witnesses
H. van Oedennee
Otto Munk

Inventors
Edmund Wiseman
John Holroyd
by
Attorneys

UNITED STATES PATENT OFFICE.

EDMUND WISEMAN, OF LUTON, AND JOHN HOLROYD, OF LONDON, ENGLAND.

HYDROCARBON-MOTOR.

SPECIFICATION forming part of Letters Patent No. 600,974, dated March 22, 1898.

Application filed April 1, 1896. Serial No. 585,781. (No model.) Patented in England June 12, 1894, No. 11,369.

*To all whom it may concern:*

Be it known that we, EDMUND WISEMAN, a resident of Luton, in the county of Bedford, and JOHN HOLROYD, a resident of London, in the county of Middlesex, England, subjects of the Queen of Great Britain, have invented new and useful Improvements in Hydrocarbon-Motors, (for which we have obtained a patent in Great Britain, No. 11,369, dated June 12, 1894,) of which the following is a specification.

Our invention relates to improvements in that class of hydrocarbon-motors consuming crude, heavy, or light hydrocarbon oils, as shown in British patent to C. T. Wordsworth, No. 7,521 of 1888, and which may be used either for land or marine purposes, and has for its objects, first, the production of a better combustible mixture or vapor from crude or heavy hydrocarbon oils or light hydrocarbon oils, as may be required; secondly, to provide means for producing the aforesaid gaseous mixture, and also means for producing a gaseous mixture from lighter hydrocarbon oils and air previous to its entrance into the combustion-chamber of the working cylinder; thirdly, to provide a Bunsen burner supplied by and used in combination with an oil-gas generator for the purpose of heating a generator formed on or applied to the combustion-chamber of the working cylinder; fourthly, an improved method of relighting the Bunsen burner just referred to; fifthly, to provide a bunsenized oil-gas blowpipe for producing initial heat for starting the motor or for other purposes; sixthly, the improved method of accumulating air under pressure for starting and other purposes; seventhly, a special method of providing an air-blast at a suitable pressure through the medium of a water column acting upon and displacing a volume of air in inclosed vessels or reservoirs of any desired number, such air-blast being used for invigorating a heavy carbonaceous flame of a bunsenized lamp or blowpipe; eighthly, a device for accurately measuring the liquid hydrocarbon to be vaporized, and, ninthly, an improved method of governing hydrocarbon-motors. We attain these objects by the mechanism illustrated in the accompanying sheets of drawings, in which—

Fig. 4, a sectional end view. Fig. $1^\times$ is a plan in section of the gas-generator at line A B, Fig. 1. Fig. $1^{\times\times}$ is a broken sectional plan showing an enlarged channel passage or pipe $i^9$, running parallel with the extended combustion-chamber $i'$ and communicating in the direction of the arrows, through an enlarged valve $i^5$, with the said extended combustion-chamber $i'$. When this arrangement is used, the valve $a^3$ (shown in Fig. 1) is dispensed with, the whole of the charge passing from $i^9$ through the charge-inlet valve $i^5$ into the extended combustion-chamber $i'$; Figs. 6, 7, 8, and 9 are vertical sections and plans, respectively, showing two modifications of our improved gas-generator. Fig. 10 is a side view and shows how the latter generator may be applied to a horizontal type of hydrocarbon-motor. Fig. 11 is a side view, partly in section, of a modification of the gas-generator extension. Fig. 12 is a vertical section, and Fig. 13 a plan, of our improved liquid-hydrocarbon measuring and feeding device; and Figs. 14, 15, and 16, respectively, a longitudinal section, plan, and end view of a modification of the same.

Similar letters refer to similar parts throughout the several views.

In carrying out our invention, and referring to Sheets I and II, we employ one or more working cylinders—say one—on annexed drawings marked $a$, which is water-jacketed and properly secured to a base plate or bed $b$, which may form or be adapted to receive tanks $c\ c'$ for the storage of hydrocarbon oil. A piston $d$, moving freely in the cylinder $a$, is connected by a rod $e$ to a crank-shaft $f$, to which is attached a fly-wheel $g$. The combustion-chamber $a'$ of the working cylinder $a$ is provided with the port or passage $a^2$ and valve $a^3$ for the purpose of permitting the entrance of the combustible gases previous to their combustion. After work has been given off and motion imparted to the piston $d$ the residual gases are allowed to pass outward through the exhaust-valve $a^4$, operated from any moving part of the motor—say by a cam $h$, fixed on the lay-shaft $h'$, and by a lever $h^2$.

In the British Patent No. 7,521 of 1888, hereinbefore referred to, the combustible charge is generated by passing hydrocarbon oil along a spiral passage in communication with a hot-air chamber and inclosed vessel, which are subjected to the action of a Bunsen or other burner, whereby the said hydrocarbon oil is vaporized, the said burner being used principally when starting the motor. This gas-generator, which is practically one with and is heated by the walls of the combustion-chamber or surrounding parts at the back end of the working cylinder, the same not being water-jacketed, is employed in connection with annular chambers (also forming part of the walls of the combustion-chambers, in one of which the gaseous vapor was further superheated and vaporized, thus preventing condensation) for the purpose of utilizing the heat from the combustion of the charge for the vaporization of the hydrocarbon oil without continuous use of the burner, the charge thus generated being ignited by a heated tube or its equivalent, if desired.

In lieu of the gas-generator just described we employ at the end of the working cylinder $a$ a gas-generator $i$, which may be of any suitable shape within the scope of our invention and is formed by the walls of the combustion-chamber (or more precisely a reduced extension of the combustion-chamber) and the surrounding or adjacent parts or compartments or their equivalent, the latter being preferably cast on the said extension of the combustion-chamber. Heat resulting from successive explosions and combustion of the gases is picked up by the walls of the reduced extended combustion-chamber and the surrounding or adjacent parts or compartments and is then given back at a suitable temperature for the production of the gaseous mixture used for each combustible charge.

Figures 1, 2:
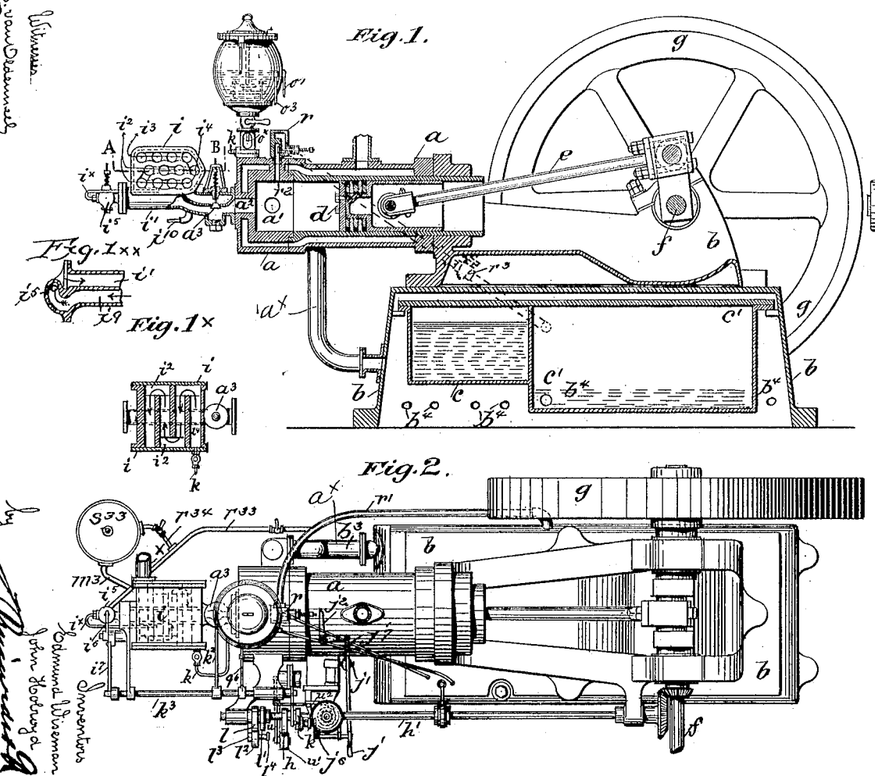
Figure 1, Sheet I, is a longitudinal section.
Fig. 2, a plan.
Figure 2:
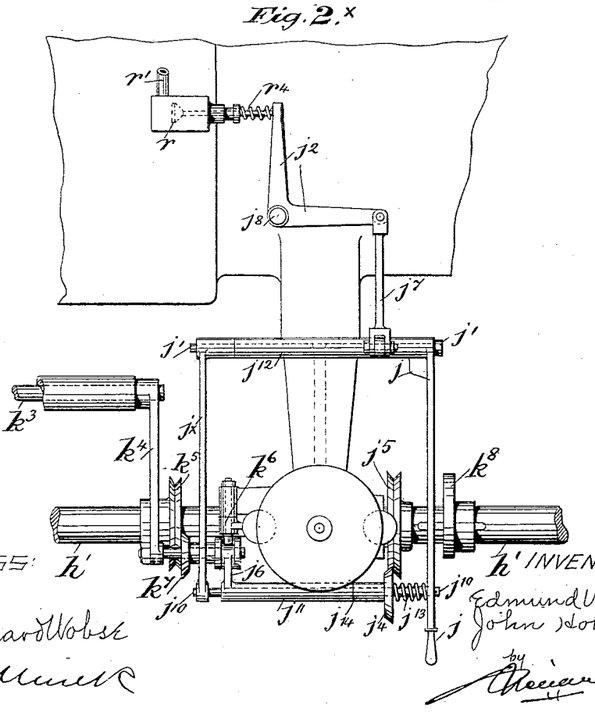

By preference our improved generator $i$ consists of a metallic box suitably secured to the end of the working cylinder $a$ and having functionally three compartments $i'\ i^2\ i^3$. The compartment $i'$ forms an extension or part of the combustion-chamber $a'$ and is in direct communication with the interior of the working cylinder $a$. The compartment $i^2$ next to the extended combustion-chamber $i'$ acts as a vaporizing and superheating chamber and forms a tortuous or winding passage (or a series of the same) which receives heat from the reduced extended combustion-chamber $i'$ and adjacent or surrounding parts and gives an increased heating-surface for the purpose of vaporizing and superheating the gaseous mixture. The compartment $i^3$ next to the last-named one is an air-heating compartment into which hot or cold air is suitably introduced, which compartment forms also a tortuous or winding passage (or a series of same) in communication with the vaporizing and superheating compartment $i^2$. The compartments $i^2\ i^3$ communicate with a hydrocarbon-oil conduit $k$, connected to a measuring apparatus, hereinafter more fully described, the said air-heating compartment being also heated by the adjacent or surrounding parts of the extended combustion-chamber $i'$. Air admitted into the compartment $i^3$ through opening or pipe $x$, Fig. 2, is highly heated by passing through its winding passage until it reaches an opening or port $i^4$, (or a valve,) communicating with the vaporizing-chamber $i^2$ beneath. At this point a supply of hydrocarbon oil is introduced through the conduit $k$ and commingled with the superheated air, both entering together the tortuous or winding passage of the vaporizing-chamber $i^2$, where they are vaporized and superheated and where the gaseous mixture thus prepared is stored for use in suitable quantities for the charge and other purposes connected with the motor.

It will be seen that the two compartments or chambers $i^2$ and $i^3$, which have, respectively, the functions described, are practically one long winding passage disposed as a tier (or row above row) forming part of or in intimate union or close contact with the extended combustion-chamber $i'$ and surrounding or adjacent parts and for the purpose of conductivity being preferably cast onto the same. It will also be understood that the hydrocarbon-oil port $i^4$ or inlet to the generator $i$ may be at any suitable part of the tortuous or winding passage. The gaseous mixture thus made being in close proximity to the combustion-chamber $a'$ and its extension $i'$ is thus superheated and maintained at a suitable temperature, thus avoiding condensation, and may be used for igniting and other purposes—i. e., starting as well as driving the motor—by impregnating the cylinder with a suitable quantity of the gaseous mixture so prepared with air at ordinary temperatures or heated, if necessary, and under pressure, if desirable. The gas thus made is dry and evolves a very light hydrocarbon spirit, which immediately reaches the point of ignition by a sudden increase of temperature due to compression, thus igniting the whole body of the combustible mixture in the combustion-chamber $a'$ and subsequently giving off work on the piston $d$. This gaseous mixture may, if desired, be used in the body of a slide-valve, plug, or its equivalent containing a pilot-light or may be used in a muffle for externally heating a tube for starting and igniting purposes. When using the said gaseous mixture for driving the motor, a portion of the same is drawn by the action of the piston $d$ into the combustion-chamber $a'$ through the charge-inlet valve $a^3$ (or valves) and port or passage $a^2$ or, as arranged in Fig. 1ˣˣ, through valve $i^5$, and in conjunction with air from the main air-supply port or valve $a^5$, drawn into the combustion-chamber $a'$ of the working cylinder $a$, is compressed, ignited, and reëxpanded, and gives off useful work on the piston $d$, as is well understood. The supply of air for the air-valve $a^5$ is taken from the inside of base $b$ through branch pipe $b^3$ and holes $b^4$ in base $b$. The charge-inlet valve $a^3$ is operated by a lever $k^2$, fixed upon a rocking shaft $k^3$, having a lever $k^4$, operated by a cam $k^5$ on the lay-shaft $h'$.

We have found in practice that, for the purpose of preventing accumulations and fouling and of sustaining a more equable and higher temperature throughout the combustion-chamber $a'$ and its extended portion, and thus securing a more perfect vaporization within the vaporizing-chamber $i^2$, it is of advantage to admit a portion of the charge at or near the end of such extended portion of the combustion-chamber $a'$—for instance, by a passage $i^×$ (or passages) and pipe $i^9$, leading to chamber $i^2$ by way of an auxiliary valve $i^5$, Figs. 1 and 2, (or valves,) into the reduced extension $i'$ of the combustion-chamber $a'$, the said auxiliary valve or valves operating at about the same time as the ordinary charge-inlet valve $a^3$ by a lever $i^6$, actuated by a rod $i^7$ from the rocking shaft $k^3$.

We may also, if desirable, employ in combination with above two or more ordinary charge-inlet valves in lieu of the one ordinarily used.

Figure 5:
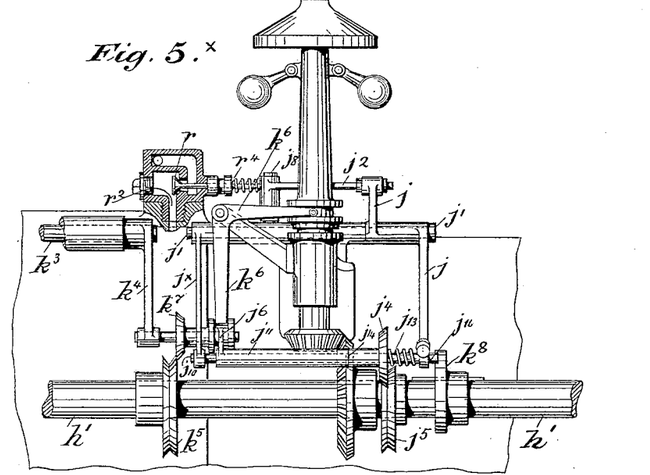
Fig. 5, Sheet II, a side view, partly in section, of our improved hydrocarbon-motor.
Figures 5, 6, 7, 8, 9, 10, 11, 12, 13, 14, 15, 16:
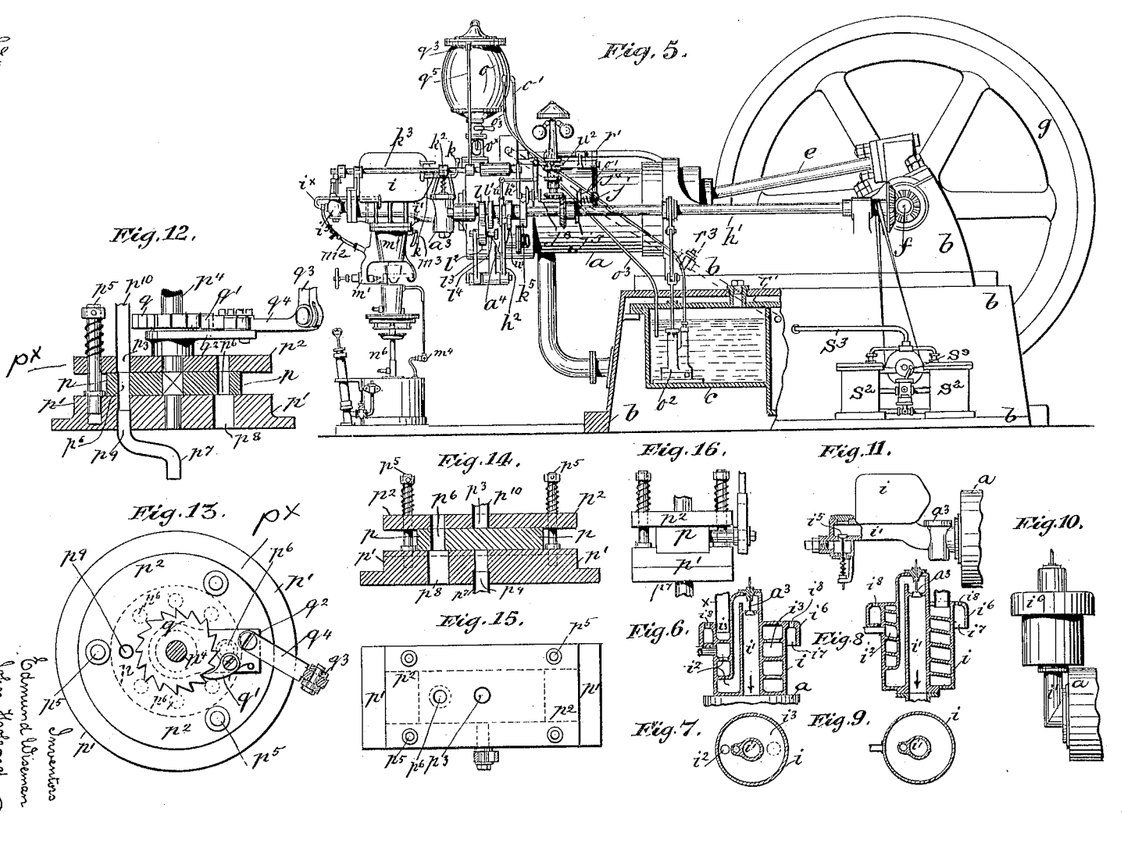

We sometimes draw aqueous vapor from any suitable source through the reduced extension $i'$ into the combustion-chamber $a'$, in which case the form of valve $i^5$ (shown in Fig. 1) would be substituted by the one shown in Fig. 11, Sheet II.

Referring to the modifications of the gas-generator $i$ described, Figs. 6 and 7 show the air heating and vaporizing chambers $i^3$ and $i^2$ arranged around the combustion-chamber extension $i'$ in the form of superposed annular passages, forming also a tier and communicating with each other at opposite sides, while Figs. 8 and 9 show the same in the form of a coil.

In each case suitable ports or passages are formed in the generator $i$ for the conduct of the air to be heated and the hydrocarbon oil to be vaporized, the prepared charge being admitted into the combustion-chamber extension $i'$ by the valves $a^3$, in this case employed at the outer end thereof.

In order to facilitate the preliminary heating of the generator $i$ in the said modified forms—say by means of the continuous gas-maker and heating-burner and the bunsenized oil-gas blowpipe hereinafter fully described—we arrange at the side or end of the generator $i$ an annular chamber or hood $i^6$, having an opening $i^7$ at one side into which the flame of the said burner or lamp is directed, the flame extending itself around the hood $i^6$ and thus heating the inclosed generator $i$. To assist in carrying off the products of combustion, small holes $i^8$ are formed in the top of the hood $i^6$.

Fig. 10 shows how any of the modified forms of gas-generators may be applied to horizontal type of hydrocarbon-motors—i. e., by forming the combustion-chamber extension $i'$ in elbow fashion, positioned vertically.

The main air-inlet valve $a^5$ is operated in the usual manner by a lever-and-cam arrangement. However, instead of using one cam only we employ, secured upon the lay-shaft $h'$, two cams $l\ l'$, of different form and time, adapted to operate upon a bowl $l^2$, arranged to be adjusted laterally on the main valve-lever $l^3$—for instance, by means of a pin $l^4$—whereby the said bowl can be brought into the path of either of the said cams and thus the time of operation of the air-valve $a^5$ be altered at will to facilitate the starting of the motor. The said adjustment may be made while the motor is in operation or at rest.

The gas-generator described may in the first instance be heated externally to the required temperature by the bunsenized oil-gas blowpipe or other means hereinafter referred to, and, if desired, a suitable part externally of the generator or reduced extended combustion-chamber $i'$ may be formed with ribs or their equivalents, as shown in Fig. 5, to which ribs the hereinafter-mentioned continuous gas-maker and heating-burner may be suitably attached. When the desired temperature is reached, the bunsenized oil-gas blowpipe may be extinguished or lowered, if desired, as the generator and motor become then independent of extraneous heat and will work automatically, developing full power.

For sustaining the gas-generator $i$ and reduced combustion-chamber extension $i'$ at the required temperature after the motor has been started when running light we employ a continuous gas-maker and heating-burner, (shown in Figs. 17 and 18 in elevation and plan, respectively,) which consists, so far as the gas-maker is concerned, principally of two tubular cylindrical parts $m\ m'$, fitting into each other, preferably conical, formed with a groove $m^2$ (or grooves) between the two faces of the said parts, the hydrocarbon oil being suitably introduced into the said groove or grooves—say from a supply vessel $s^{33}$ (see Fig. 2) and air-feed pipes $r^{33}$ and $r^{34}$, having taps by the pipe $m^3$ and valve $m^4$.

In order to vaporize the hydrocarbon oil while passing through the groove $m^2$, (or grooves,) the said continuous gas-maker is combined with a bunsenized heating-burner $m^5$, the flame of which plays through the middle of the continuous gas-maker, thus heating the same and gasifying the hydrocarbon oil, and the gas thus produced is conveyed to a jet-piece $m^9$, formed at the extension of $m'$, playing into an air-tube $m^{15}$, forming part of the bunsenized heating-burner $m^5$, whereby the vapor is bunsenized, as will be readily understood. A regulating tap and needle $m^{12}$ are provided to control the volume of gas issuing from the jet-piece $m^9$.

A portion of the gas made by the continuous gas-maker and heating-burner may be introduced into the gas-generator $i$—say, for instance, by a pipe $m^8$, connected with the cone $m'$—as shown, in order to facilitate an earlier start with the motor.

To prepare for stoppages and restarting and to facilitate relighting the said continuous gas-maker and heating-burner, we attach the latter (lettered $m$ and $m'$) to the gas-generator $i$ in the manner shown in Fig. 5, so that when the hydrocarbon oil is introduced into the passage $m^2$ by opening the regulating-valve $m^4$ it is, by reason of the heat received by conduction from the generator $i$, gasified, when the bunsenized heating-burner $m^5$ may be relighted for the purpose of sustaining heat in the gas-generator $i$, as previously described.

Figures 17, 18, 19, 20, 21, 22:
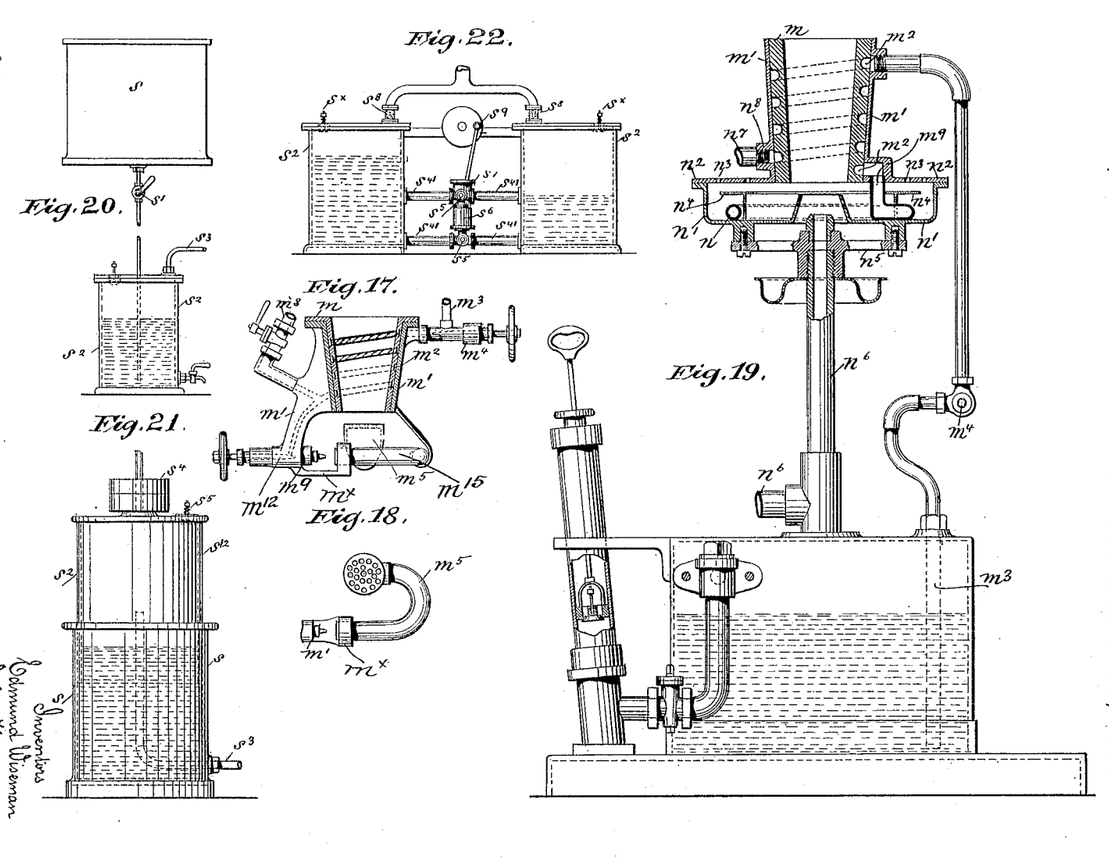
Fig. 17, Sheet III, is a vertical section of the continuous gas-maker and heating-burner.
Fig. 18, a plan of the bunsenized heating-burner only employed for providing heat when running the motor light or during stoppages.
Fig. 19 is a vertical section of the bunsenized oil-gas blowpipe.
Figs. 20, 21, and 22 are elevations of various forms of devices for creating a slight air-pressure for the purpose of intensifying a heavy carbonaceous flame or Bunsen burner used in connection with our improved hydrocarbon-motor and for propelling the piston when starting the motor, as hereinafter explained. Fig. $5^\times$, Sheet IV, is an enlarged view of a part of Fig. 5, Sheet II; Fig. $2^\times$, an enlarged view of the air-valve and its operating mechanism, Sheet I; Fig. $3^\times$, Sheet V, an enlarged view of Fig. 3, Sheet I; and Fig. $2^{\times\times}$, some details, further enlarged.

As an initial heating medium for the continuous gas-maker and heating-burner, Figs. 17 and 18, and at the same time the generator $i$ and reduced extended combustion-chamber $i'$, (the burner $m^5$ being meanwhile removed,) we preferably employ a bunsenized oil-gas blowpipe, Fig. 19, which is also applicable to other purposes, connected with the hydrocarbon-motor, and may be suitably attached to same. As shown in Fig. 17, the burner $m^5$ is held by its pipe $m^{15}$, fitting into a bracket $m^\times$, and said pipe may be readily inserted into or removed from said bracket. The said bunsenized oil-gas blowpipe consists of a gas-maker formed of two tubular cylindrical parts $m$ $m'$, (see Fig. 19, elevation partly in section,) fitting into each other, preferably conical, and formed with a groove $m^2$ (or grooves) between the faces of the said parts, into which groove hydrocarbon oil is suitably introduced either by pressure or gravitation, as illustrated in Fig. 17, where pipe with inlet $m^3$ and regulating-needle valve $m^4$ leads to said groove, from which the said hydrocarbon oil is conveyed to a jet-ring $n$, employed in a vaporizing-dish $n'$, having a cover $n^2$, with an aperture or apertures $n^3$ for the admission of air, the said cover forming a part of the gas-maker cone $m'$. The vaporizer-dish $n'$ has also an open raised cone $n^2$ in center of same for inducing air in addition to that from jet-piece $n^9$. Over the said jet-ring is employed in the vaporizing-dish $n'$ a deflector $n^4$ for the purpose of building up the flame, and the vaporizing-dish itself is suitably supported—say by cross-shaped arms $n^5$—and arranged in connection with an air-jet pipe $n^6$ and jet-piece $n^9$, similar to a blow-pipe.

As soon as the parts $m$ $m'$ of the continuous gas-maker, Fig. 17, are sufficiently heated by the action of the flame of the bunsenized oil-gas blowpipe the latter is withdrawn and the bunsenized heating-burner $m^5$, Fig. 18, is attached to evolve gas, the regulating-tap and regulating-needle being adjusted when the generator and Bunsen burner combined work automatically. A portion of the gas made by the bunsenized oil-gas blowpipe may be introduced into the gas-generator $i$—say, for instance, by a pipe $n^7$, connected at $n^8$ to the cone $m'$—in order to facilitate an earlier start with the motor.

Figure 3:
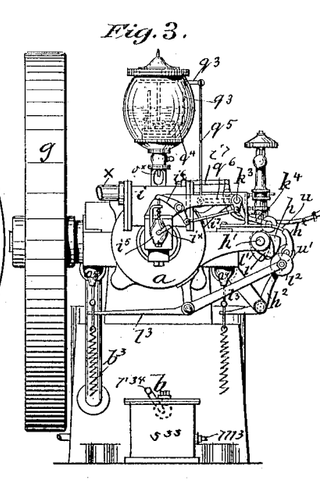
Fig. 3, an end view.
Figure 4:
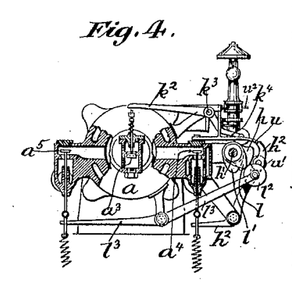

Referring to Figs. 1, 2, and 3, Sheet I, and Figs. 5, 12, 13, 14, 15, and 16, Sheet II, the liquid hydrocarbon is fed into the gas-generator $i$ in measured quantities from a reservoir $c$, preferably arranged in the bed of the motor in the following manner: Upon the working cylinder $a$, Fig. 5, is mounted upon a sight-feed glass $o^\times$ a vessel $o$, covered by a lid and connected by means of a pipe $o'$ to a pump $o^2$, employed in the hydrocarbon-oil reservoir $c$, which pump is actuated from the lay-shaft $h'$ and supplies the vessel $o$ constantly with hydrocarbon oil, another pipe, $o^3$, connected with the vessel $o$, allowing the excess of oil to flow back into the reservoir $c$. Near the bottom of vessel $o$ is employed a measuring device $p^\times$, which is immersed in the liquid hydrocarbon and consists of a disk $p$, (see Figs. 12 and 13,) formed with concentrically-arranged chambers $p^6$, each of a capacity equal to the maximum quantity of liquid hydrocarbon used when working at full power and caused to move between two metallic faces—viz., a base-plate $p'$ and a cover $p^2$—the said disk being secured upon a shaft $p^4$, suitably rotated and mounted in the base-plate $p'$ and cover $p^2$, which latter is held in position by studs and springs $p^5$. The chambers $p^6$ are timed to operate in conjunction with ports and passages $p^8$ $p^9$, $p^8$ serving for the inlet and $p^9$ for the outlet of the liquid hydrocarbon, the latter being suitably brought into communication with the vaporizing-chamber $i^2$ of the gas-generator $i$—say by the sight-feed glass $o^\times$ and pipe $k$. A vent or other passage $p^3$ is formed in the plate $p^2$ and communicates with a tube $p^{10}$, fixed upon the cover-plate $p^2$ and leading to the atmosphere.

The chambers $p^6$ passing successively underneath the passage $p^8$ during the period of the suction-stroke of the motor-piston, the liquid hydrocarbon contained in the respective chambers $p^6$ is drawn into the generator $i$ by way of the pipe $p^7$, sight-feed glass $o^\times$, and pipe $k$ when drawing the combustible vapor into the working cylinder.

In the present instance the disk $p$ is rotated from the rocking shaft $k^3$ in the following manner: Upon the disk-shaft $p^4$ is fixed a ratchet-wheel $q$, in which engages a pawl $q'$, carried by a lever-arm $q^2$, oscillating loosely upon the shaft $p^4$. To the top of the vessel $o$ is hinged a bell-crank lever $q^3$, (see Fig. 3,) the lower end of which by means of a link $q^4$ is connected to the lever-arm $q^2$ and the upper end by means of a rod $q^5$ to a lever $q^6$, fixed upon the rocking shaft $k^3$, so that upon each oscillation of the latter the disk-chambers $p^6$ are brought successively over the inlet and outlet ports $p^8$ and $p^9$.

In lieu of carrying out the main features connected with the said measuring device in a rotary form, as described, the measuring-disk may take the form of a reciprocating slide, as shown in Figs. 14, 15, and 16.

We also provide means for accumulating air under pressure to be used for starting and other purposes (see Figs. 1, 2, 3, and 5) by the application to the working cylinder $a$ of a port $r^2$, valve $r$, the latter operating in a casing shown in section and actuated by suitable levers, bowl, and cams, or any moving part of the motor, (one of the levers $j$ being extended to serve as a manual-lever for operating valve $r$ when starting the motor,) and governor mechanism actuating and controlling valve $r$ through the aforesaid levers, bowl, and cams, and an outlet-pipe $r'$ leading from valve $r$ to one or more air chambers or reservoirs in any suitable position, but preferably cast in or forming a part of the base $b$, with a stop-cock or regulating-tap $r^3$ interposed in the outlet-pipe $r'$, the said air volume being trapped off from the working cylinder $a$ during the idle strokes of the motor. When the motor is running, air drawn into the cylinder $a$ during the previous outstroke is compressed by the piston $d$ on its instroke during the idle strokes of the motor and is forced by way of port $r^2$, valve $r$, and outlet-pipe $r'$ into the chamber $c'$ under compression and there stored for utilization in the manner hereinafter explained, the valve $r$ at this time being lifted off its seat by the bell-crank lever $j^2$ under the action of the governor and connecting parts, as hereinafter described in detail. The air so stored is permitted to accumulate in chamber $c'$ to any desired pressure or until the pressures in the chamber $c'$ and the cylinder $a$ coincide in equilibrium, when no more air can pass into chamber $c'$, which may then be secured against leaking by turning the stop-cock $r^3$. The spring for returning valve $r$ is arranged to offer sufficient resistance to allow of the accumulation of any desired pressure in the chamber $c'$, and after such pressure is obtained the spring automatically relieves any superadded pressure from the chamber $c'$ to the cylinder.

The means whereby the valve $r$ is actuated under the control of the governor is as follows: The lever $j$ is secured to a rock-shaft $j'$, carried by a bracket $j^{12}$, and actuates, by the connecting-link $j^7$, the bell-crank lever $j^2$, the bell-crank lever $j^2$ actuating the valve-spindle $r^4$ of the valve $r$ and thus lifting it off its seat. Lever $j$ has a stud $j^{10}$ secured on it, carrying a bowl $j^4$ and a socket $j^{11}$, the bowl $j^4$ engaging with the cam $j^5$ and a finger-piece $j^6$ extending from the socket $j^{11}$, engaging between collars on the bowl $k^7$ for the purpose of shifting it laterally, the said bowl $k^7$ being carried by the lever $k^4$ and being under the control of the governor by means of the lever $k^6$, thus bringing the said bowl $k^7$ and bowl $j^4$ under the alternate action of their respective cams $k^5$ and $j^5$, the said cams being secured upon the lay-shaft $h'$, and thereby when bowl $j^4$ engages with cam $j^5$ operating the valve $r$.

The rock-shaft $j'$ of lever $j$ carries at its other end a supplementary lever $j^\times$, the latter serving to support the before-mentioned stud $j^{10}$. The bowl $j^4$ and socket $j^{11}$ have a sliding movement on stud $j^{10}$, controlled by the collars on bowl $k^7$ and the finger-piece $j^6$. The bowl $j^4$ rotates freely on the stud $j^{10}$, upon which is also mounted socket $j^{11}$, their shoulders $j^{14}$ being kept in contact with each other by a spring $j^{13}$.

It will be seen that when the bowl $j^4$ is in the position shown in Fig. $2^\times$ the intermediate mechanism is operated and effects the movement of valve $r$, which brings cylinder $a'$ into open communication with chamber $c'$ at this time and allows a volume of air under compression to pass from cylinder $a'$ through port $r^2$ and valve $r$ and pipe $r'$ into the reservoir $c'$, thus utilizing the idle or waste stroke of the motor at the time when combustion is not being effected in the combustion-chamber.

Having described the method by which air is stored in chamber $c'$ under compression, we now proceed to describe the method of utilizing it for starting the motor. To do this, the piston and crank of the motor are put into the proper position for starting, the stop-cock $r^3$ is opened, and the lever $j$ is elevated by hand, and at the same moment a cam $k^8$, which is arranged to slide lengthwise on the lay-shaft $h'$, is slid under the said lever $j$ or under an abutment on same, thus lifting valve $r$ off its seat on the expansion stroke of the piston, the cam $k^8$ continuing to lift the lever $j$, and thus the valve $r$, off its seat at this time during the further revolutions of the motor until ignitions are effected, whereby a portion of the compressed air accumulated in the chamber $c'$ during the previous running of the motor, as already described, is allowed to expand into the working cylinder $a$ by way of pipe $r'$, valve $r$, and port $r^2$, by means of which a first impulse is given to the piston, which is thus impelled outward by the mechanical action of the compressed air.

As soon as ignitions are effected the cam $k^8$ is shifted, so that it will no longer contact with the lever $j$, the cam $j^5$ now coming into operation again, when the parts again operate to accumulate air under pressure in the chamber $c'$ in the manner already explained. We may arrange to slide bowl $j^4$ out of gear with cam $j^5$ when sufficient air under compression is accumulated—say by interposing a distance-piece between the shoulders $j^{14}$. We prefer, however, to utilize the air so compressed for starting purposes in combination with a portion of the gaseous vapor produced by the continuous gas-maker and heating-burner, such gaseous vapor being allowed to flow through the pipe and tap $m^8$ and valve $i^3$ or $i^5$ (which are operated at this time by hand) into the reduced extended combustion-chamber $i'$, where they meet in the combustion-chamber $a'$ and its reduced extension $i'$ with compressed air which had been stored up in chamber $c'$, the said compressed air flowing in by way of pipe $r'$, valve $r$, and port $r^2$ into the cylinder $a$ in the manner before explained. The air thus introduced into the cylinder $a$ at superior pressure compresses the combustible gaseous vapor just mentioned into the heated parts of the reduced extended combustion-chamber $i'$ and heated tube $i^{10}$, where ignition is effected, thus giving an impulse to the motor, when the crank is suitably positioned or the charge may be electrically fired, as is well understood.

In lieu of using gaseous vapor produced by the continuous gas-maker and heating-burner we may introduce gaseous vapor made by the bunsenized oil-gas blowpipe by connecting the outlet $n^7$, Fig. 19, with the valve $i^5$ of the generator $i$.

We further provide means for accumulating air under pressure to be used for the bunsenized oil-gas blowpipe, Fig. 19, and for starting the motor.

Referring to Fig. 22, giving detailed view of the apparatus, and to Fig. 5, showing outline view of the apparatus applied, we employ two vessels $s^2$ $s^2$, containing water or other suitable liquid, connected by pipes $s^{41}$ $s^{41}$ and having three-way suction and delivery cocks $s^5$ $s^5$, the lower one serving for suction and the upper one for delivery, and inlet and outlet non-return air-valves $s^\times$ and $s^8$, respectively, and also suction and delivery valves (not shown) operating in valve-casing $s^6$, attached to a trunk plunger-pump $s^7$ and connected by a rod $s^{10}$ to a crank $s^9$, from which it receives its motion, the latter being operated by hand or by any moving part of the motor, and thus displacing and interchanging the positions of the respective liquid and air volumes in the vessels $s^2$ $s^2$, the air displaced by the water forced forward by each stroke of the trunk plunger-pump $s^7$ being forced under compression through non-return valves $s^8$ and branch pipes $s^3$ into a chamber or reservoir, such as $c'$. While the left-hand vessel $s^2$ is being filled with liquid forced by the continuous action of the trunk plunger-pump $s^7$ from the right-hand vessel $s^2$ to the left-hand vessel $s^2$, the air thus compressed passes through the left-hand non-return outlet air-valve $s^8$ and branch pipe $s^3$, air being simultaneously drawn in through the inlet air-valve $s^\times$ on the right-hand side. When the left-hand vessel $s^2$ becomes full and the right-hand vessel $s^2$ empty, the three-way cocks $s^5$ $s^5$ are either moved by hand or operated by any moving part of the motor (the mechanism for reversing not shown) when the flow takes place in the opposite direction, the compressed air then passing through the right-hand non-return outlet-valves $s^8$, air at atmospheric pressure being drawn in through the left-hand air-valve $s^\times$. It will thus be seen that the compressed air sometimes passes by way of the right-hand non-return outlet air-valve $s^8$; but in both instances passes through the branch pipe $s^3$ into the chamber $c'$, the compressed air thus stored being afterward utilized for the purpose of maintaining an active volume of air, first, to be used for intensifying the heavy carbonaceous flame of the bunsenized oil-gas blowpipe by connecting the chamber $c'$ by a branch pipe with the air-inlet pipe $n^6$ in Fig. 19, the heat from which is utilized in the generator $i$ and reduced extended combustion-chamber $i'$ of the combustion-chamber of the working cylinder previously mentioned; second, to be used for starting by passing a portion of it into the combustion-chamber $a'$ of the working cylinder $a$ through pipe $r'$, valve $r$, and port $r^2$, in the manner previously explained, for the purpose of expanding into the combustion-chamber $a'$ of the working cylinder $a$ and impelling the piston forward and thus starting the motor; third, to be used for starting by passing a portion of it into the combustion-chamber $a'$ of the working cylinder $a$ through pipe $r'$, valve $r$, and port $r^2$ in combination with a portion of the gaseous vapor produced by the continuous gas-maker or the bunsenized oil-gas blowpipe, in the manner already explained, for the purpose of giving an impulse to the piston by the expansion of the compressed air and the ignition of the combustible vapor, and thus starting the motor.

The air compressed by the hydraulic arrangement just described is sometimes used as auxiliary to that described earlier on as being compressed by the action of the piston.

Figs. 20 and 21 show hydraulic arrangements adapted for giving a slight air-pressure for intensifying the flame of the bunsenized oil-gas blowpipe shown in Fig. 19.

What we claim as our invention, and desire to secure by Letters Patent, is—

1. In hydrocarbon-motors and in combination with the combustion-chamber $a'$ the gas-generator $i$ having three compartments $i'$ $i^2$ $i^3$ cast in one piece or formed in close contact with each other; $i^2$, $i^3$, forming a tier of tortuous or winding passages, making two compartments, which have heat imparted by conduction from the compartment $i'$ which forms a reduced extension of the combustion-chamber $a'$, the compartment $i^3$ serving for the heating of air and the compartment $i^2$ for the vaporization of the hydrocarbon oil led into it by the hydrocarbon-oil conduit $k$, and the mixing of it with the heated air all substantially as set forth.

2. In hydrocarbon-motors and in combination, the combustion-chamber $a'$ the cylinder having a compartment $i'$ forming a reduced extension of the combustion-chamber $a'$ and having the gas and air heaters and mixer $i^2$, $i^3$, surmounted thereon, the said heaters and mixer comprising a tier of tortuous or winding passages forming functionally two compartments and a charge-inlet valve $a^3$ communicating with the compartments $i^2$ and $i'$, all substantially as set forth.

3. In hydrocarbon-motors, the cylinder having the combustion-chamber, the gas-generator $i$ having the compartment $i^2$ for vaporizing the hydrocarbon and the compartment $i'$ forming a reduced extension of the combustion-chamber, a charge-inlet valve $a^3$ at one end of the compartment $i^2$, and the valve $i^5$ at the other end of the said compartment $i^2$, communicating with the compartment $i'$ by pipe and passage $i^9$, whereby a portion of the combustible charge is, upon valve $i^5$ being actuated, diverted from the compartment $i^2$ and admitted into compartment $i'$ all substantially as set forth.

4. In hydrocarbon-motors the combination of the reservoir $c'$, piston $d$, combustion-chamber $a'$ of the working cylinder $a$, port $v^2$, valve $r$, and pipe $r'$, the latter leading from the combustion-chamber $a'$ to chamber $c'$, main air-inlet valve $a^5$, and the intermediate mechanism actuated by cams $k^5$ and $j^5$ on the lay-shaft $h'$ and under the control of the governor for the purpose of trapping off air from the combustion-chamber $a'$ and storing it under compression in the chamber $c'$ during the idle strokes of the motor, and the mechanism comprising the cam $k^3$ adapted to slide along the lay-shaft $h'$ and under lever $j$, lever $j$, link $j^7$, and the bell-crank lever $j^2$ for actuating valve $r$ on the expansion stroke of the motor for the purpose of readmitting compressed air from chamber $c'$ by way of pipe $r'$, valve $r$, and port $r^2$ into the combustion-chamber $a'$ of the cylinder $a$, either together with or without a charge of gaseous vapor, and thus giving piston $d$ an impulse or impulses and starting the motor, the charge of gaseous vapor when used being obtained by connecting the generator $i$ with pipe $m^8$ of the continuous gas-maker, the charge passing by way of valve $i^3$ or $i^5$ into the reduced extension $i'$ of the combustion-chamber (said valve or valves being at this time manually operated) all substantially as set forth.

5. In hydrocarbon-oil motors the combination of the combustion-chamber, the generator $i$, the continuous gas-maker and heating-burner, and the pipe $m^8$ connecting the latter with the generator $i$, whereby a portion of the gas made by the continuous gas-maker is introduced into the generator $i$ for the purpose of obtaining an earlier start with the motor, all substantially as set forth.

6. In hydrocarbon-oil motors, the combination of the combustion-chamber, the generator $i$ and the continuous gas-maker and heating-burner having a regulating-tap, being so attached to the generator $i$ as to receive heat from the generator $i$ by conduction during the working of the motor so that upon opening the regulating-tap $m^4$ the hydrocarbon oil entering the continuous gas-maker is vaporized and the heating-burner $m^5$ may thus be relighted without having first to raise its temperature by the aid of a flame, for the purpose of preparing for stoppages and sustaining the heat of the generator $i$ ready for restarting the motor or while running the motor light, all substantially as set forth.

7. In hydrocarbon-motors, the combination of the combustion-chamber, the generator $i$, the continuous gas-maker and heating-burner, the latter being attached to the generator $i$ for the purpose of receiving heat from same, and the bunsenized oil-gas blowpipe for the intense preliminary heating of the gas-generator $i$ and at the same time the continuous gas-maker all substantially as set forth.

8. In hydrocarbon-oil motors, the combination of the combustion-chamber, the generator $i$ the continuous gas-maker, a bunsenized oil-gas blowpipe for the intense preliminary heating of the generator $i$ and the continuous gas-maker, and a hydraulic apparatus for the purpose of producing an air-pressure to be utilized for intensifying the flame of the said bunsenized oil-gas blowpipe, all substantially as set forth.

9. In a hydrocarbon-motor, the combination of the combustion-chamber, and compressed-air chamber, a hydraulic apparatus having a branch pipe $s^3$ connecting it to chamber $c'$, pipe $r'$ connecting chamber $c'$ with valve $r$, valve $v$, port $r^2$, combustion-chamber $a'$, piston $d$, lay-shaft $h'$, cam $k^8$ and connecting mechanism consisting of lever $j$, link $j^7$, bell-crank lever $j^2$, for actuating valve $r$ on the expansion stroke, and permitting the air compressed by the hydraulic apparatus and stored in cylinder $c'$ to expand into the combustion-chamber $a'$, either together with or without a charge of gaseous vapor the continuous gas-maker, and introduced into the connecting-pipe $m^8$ between said generator and gas-maker, the charge passing into the reduced extension $i'$ by way of valve $i^5$ or $i^3$ (said valve or valves being at this time manually operated) for the purpose of impelling the piston $d$ forward and starting the motor, all substantially as set forth.

10. In hydrocarbon-motors the combination of the combustion-chamber, the generator $i$ and a hydrocarbon-oil-measuring apparatus, comprising a tank, a plate therein having an inlet and an outlet for the oil, a movable plate having pockets or openings to convey the oil from the inlet to the outlet, an upper confining-plate for the movable plate and means for operating the movable plate, the plates of the said feeding device being entirely immersed in the liquid of the tank, substantially as described.

11. In hydrocarbon-motors, the combination of the combustion-chamber, the generator $i$ and a hydrocarbon-oil-measuring apparatus, in combination with an oil-motor and its vaporizing-chamber, an oil-supply apparatus comprising a tank, a plate therein having an inlet and outlet opening, a movable plate having oil pockets or openings extending through the same, a top plate, a vent-tube extending through the same and means for operating the movable plate, substantially as described.

12. In combination with the cylinder and piston with the combustion-chamber in the cylinder, the gas-generator $i$ connected with the cylinder and the combustion-chamber thereof, and the continuous gas-maker and heating-burner connected with the generator to be heated therefrom by conduction said gas-maker and burner comprising the two tubular parts $m$, $m'$, one fitting into the other and formed with a spiral groove $m^2$ between their faces communicating with a hydrocarbon-oil inlet $m^3$ and regulating-valve $m^4$ and having the hydrocarbon-oil gas outlet and jet, substantially as described.

In witness whereof we have hereunto set our hands in presence of two witnesses.

EDMUND WISEMAN.
JOHN HOLROYD.

Witnesses:
WM. HARRIS,
JOSEPH LAKE.